United States Patent [19]
Weldin

[11] Patent Number: 5,285,748
[45] Date of Patent: Feb. 15, 1994

[54] SQUIRREL-PROOF BIRD FEEDER APPARATUS

[76] Inventor: Roland E. Weldin, 276 Locust La., New Lenox, Ill. 60451

[21] Appl. No.: 20,609

[22] Filed: Feb. 22, 1993

[51] Int. Cl.⁵ ............................................. A01K 39/01
[52] U.S. Cl. ...................................... 119/57.9; 52/101
[58] Field of Search .................... 119/52.2, 52.3, 57.8, 119/57.9, 26; 52/101

[56] References Cited

U.S. PATENT DOCUMENTS

| | | | |
|---|---|---|---|
| D. 174,139 | 3/1955 | Sadler | 119/52.3 |
| 2,896,575 | 7/1959 | Scruggs | 119/57.9 |
| 3,145,690 | 8/1964 | Bachman | 119/52.3 |
| 4,259,927 | 4/1981 | Clarke | 119/57.9 |
| 4,318,364 | 3/1982 | Bescherer | 119/57.8 |
| 4,829,934 | 5/1989 | Blasbalg | 119/57.8 |
| 4,974,547 | 12/1990 | Graham | 119/52.3 |
| 5,103,768 | 4/1992 | Slowinski | 119/57.8 |
| 5,195,459 | 3/1993 | Ancketill | 119/57.9 |

Primary Examiner—Gene Mancene
Assistant Examiner—Todd E. Manahan
Attorney, Agent, or Firm—Leon Gilden

[57] ABSTRACT

A bird feeder apparatus includes an elongate tubular housing, having a floor mounted intermediate the first and second ends of the tubular housing, with the support post secured to the floor within the tubular housing. The housing includes an annular ring extending about the housing in adjacency to the floor exteriorly of the housing, wherein feed slots directed through the housing permit access to food and projection of food from the housing through the slots. A cap structure mounted to a second end of the housing permits filling of food within the housing.

3 Claims, 4 Drawing Sheets

FIG. 5
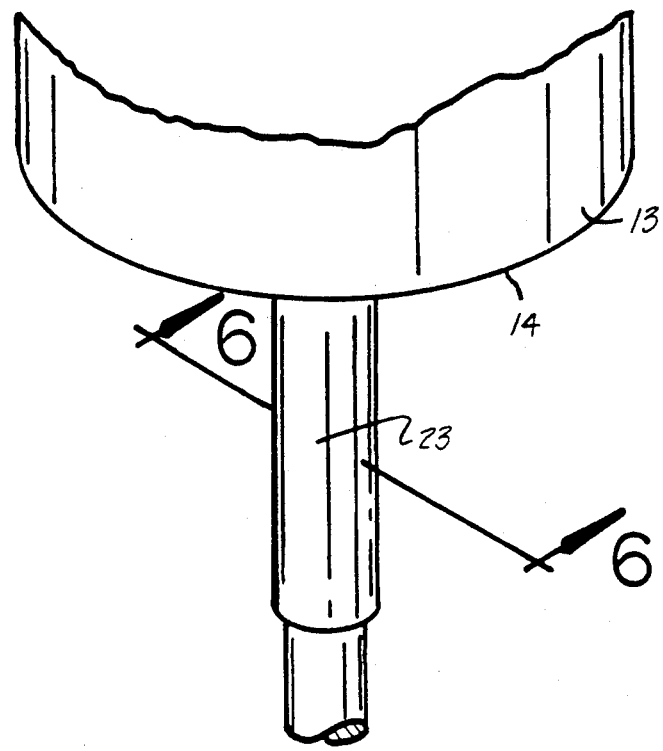
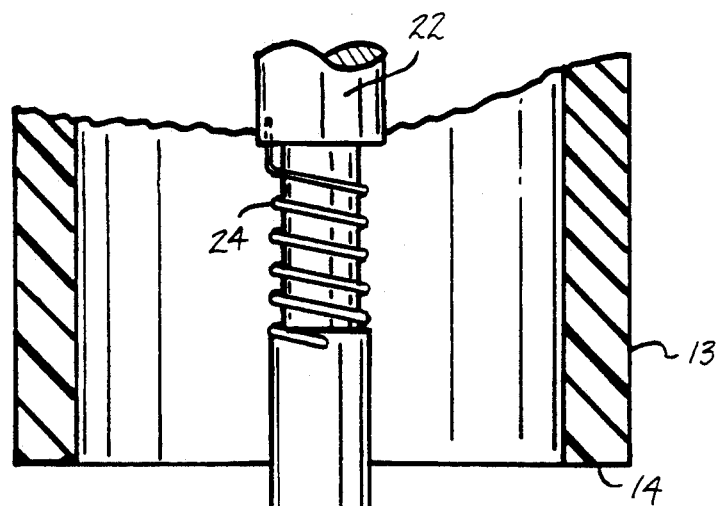
FIG. 6

SQUIRREL-PROOF BIRD FEEDER APPARATUS

BACKGROUND OF THE INVENTION

1. Field of the Invention

The field of invention relates to bird feeder apparatus, and more particularly pertains to a new and improved bird feeder apparatus wherein the same permits selective filling of bird feed within the housing and directing the bird feed exteriorly of the housing while preventing access of animals to the bird feed.

2. Description of the Prior Art

Bird feed apparatus of various types is available in the prior art such as exemplified in the U.S. Pat. Nos. 4,144,842; 4,541,362; 4,867,104; and 4,974,547.

The instant invention attempts to overcome deficiencies of the prior art by providing for a bird feeder apparatus of simple construction preventing access of animals to feed within the housing and in this respect, the present invention substantially fulfills this need.

SUMMARY OF THE INVENTION

In view of the foregoing disadvantages inherent in the known types of bird feeder apparatus now present in the prior art, the present invention provides a bird feeder apparatus wherein the same includes a housing extending beyond a support post upper distal end preventing access of animals to feed from the housing. As such, the general purpose of the present invention, which will be described subsequently in greater detail, is to provide a new and improved bird feeder apparatus which has all the advantages of the prior art bird feeder apparatus and none of the disadvantages.

To attain this, the present invention provides a bird feeder apparatus including an elongate tubular housing, having a floor mounted intermediate the first and second ends of the tubular housing, with the support post secured to the floor within the tubular housing. The housing includes an annular ring extending about the housing in adjacency to the floor exteriorly of the housing, wherein feed slots directed through the housing permit access to food and projection of food from the housing through the slots. A cap structure mounted to the second end of the housing permits filling of food within the housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bird feeder apparatus which has all the advantages of the prior art bird feeder apparatus and none of the disadvantages.

It is another object of the present invention to provide a new and improved bird feeder apparatus which may be easily and efficiently manufactured and marketed.

It is a further object of the present invention to provide a new and improved bird feeder apparatus which is of a durable and reliable construction.

An even further object of the present invention is to provide a new and improved bird feeder apparatus which is susceptible of a low cost of manufacture with regard to both materials and labor, and which accordingly is then susceptible of low prices of sale to the consuming public, thereby making such bird feeder apparatus economically available to the buying public.

Still yet another object of the present invention is to provide a new and improved bird feeder apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric view of the first end of the housing having a sleeve member slidably mounted relative to the support post.

FIG. 6 is an orthographic view, taken along the lines 6—6 of FIG. 5 in the direction indicated by the arrows.

DESCRIPTION OF THE PREFERRED EMBODIMENT

Figure 1:
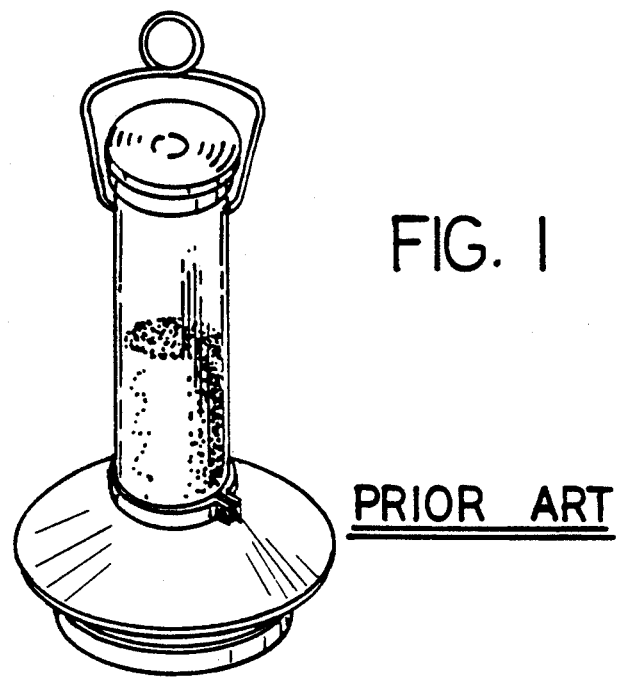
FIG. 1 is an isometric illustration of a prior art bird feeder apparatus, as indicated in U.S. Pat. No. 4,144,842, having a roof portion extending above an underlying tray preventing access of crawling animals to the tray.
Figure 2:
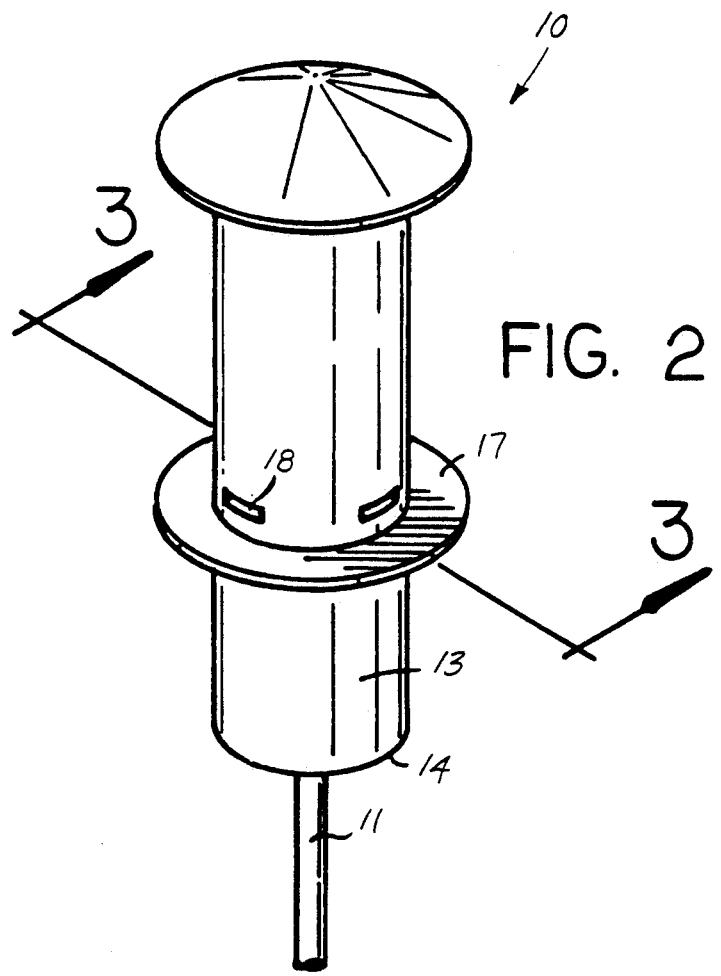
FIG. 2 is an isometric illustration of the invention.

With reference now to the drawings, and in particular to FIGS. 1 to 8 thereof, a new and improved bird feeder apparatus embodying the principles and concepts of the present invention and generally designated by the reference numeral 10 will be described.

Figure 3:
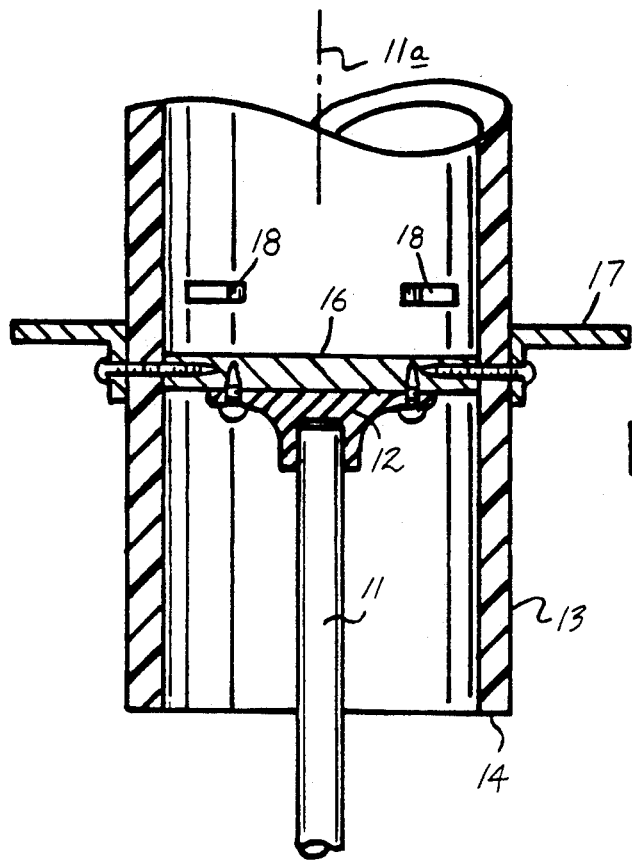
FIG. 3 is an orthographic view, taken along the lines 3—3 of FIG. 2 in the direction indicated by the arrows.
Figure 4:
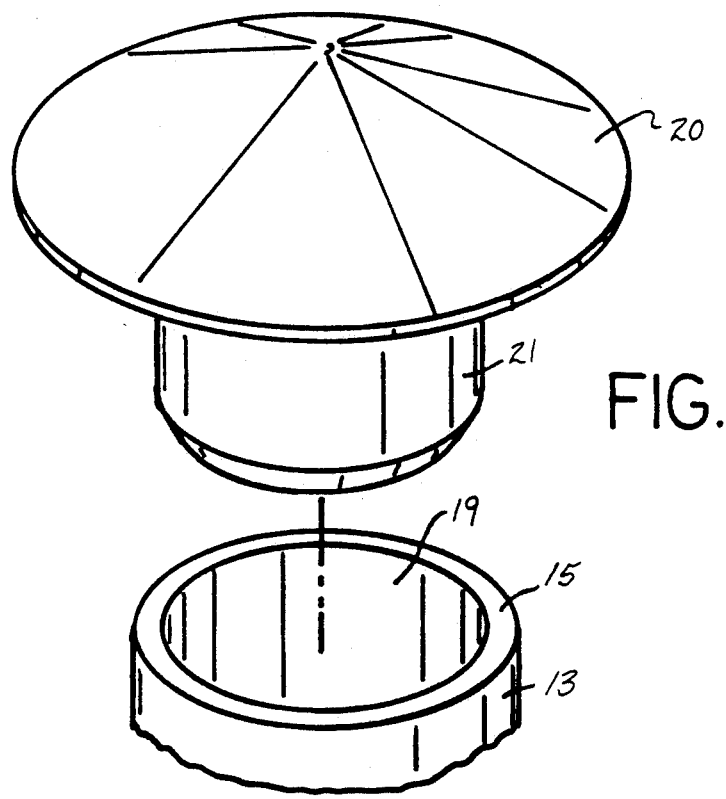
FIG. 4 is an isometric view of the cap member arranged for securement to the second end of the housing.

More specifically, the bird feeder apparatus 10 of the instant invention essentially comprises a support post 11, having a support post plate orthogonally and fixedly mounted to an uppermost distal end of the support post received within a tubular housing 13 in a coaxially aligned relationship within the tubular housing along a housing axis 11a (see FIG. 3). The tubular housing 13 includes a housing first end 14 spaced from a housing second end 15, and a housing floor 16 mounted within the housing 13 between the first and second ends 14 and 15. The floor is arranged for securement to the support post plate 12. A support ring 17 is fixedly mounted in surrounding relationship relative to the tubular housing 13 in adjacency to the housing floor 16 in adjacency to the floor. A plurality of housing slots 18 are directed through the housing between and adjacent the floor 16 and the ring 17, with the slots oriented between the floor 16 and the housing second end 15. A housing cavity 19 (see FIG. 4) is accessed for the filling of bird seed by removal of a cap plug 21 received within the housing cavity, having a conical cap plate 20 extending laterally beyond the housing second end 15 for abutment therewith to prevent projection of the cap plate 20 within the housing cavity 19.

A first sleeve 22 is fixedly mounted to the support post 11 extending from the support post plate 12 to a spaced orientation relative to the housing first end 14. A second sleeve 23 is slidably mounted along the post 11 extending from within the housing to position exteriorly of the housing below the housing first end 14, with a spring 24 wound about the support post securing the first and second sleeves 22 and 23 together. In this manner, a squirrel or other crawling animal or the like having access to the second sleeve 23 effects sliding of the second sleeve 23 along the post 11 to frighten the animal preventing the animal and discouraging such animal from attempting to climb further along the post structure 11. With the elimination of the first and second sleeves 22 and 23, as well as the associated connecting spring 24, the animal's only recourse is for reception within the housing between the plate 12 and the first end 14.

Figure 7:
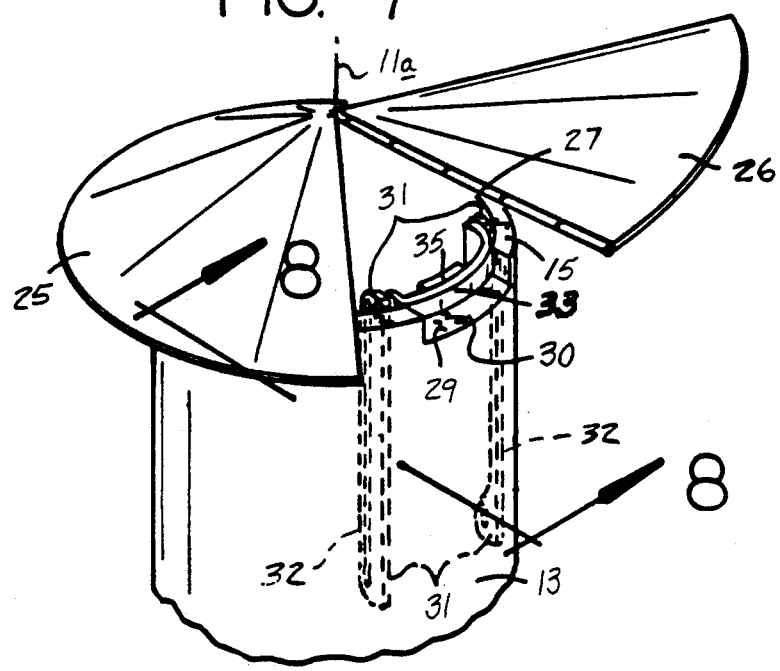
FIG. 7 is an isometric illustration of a modified second end portion of the housing.
Figure 8:
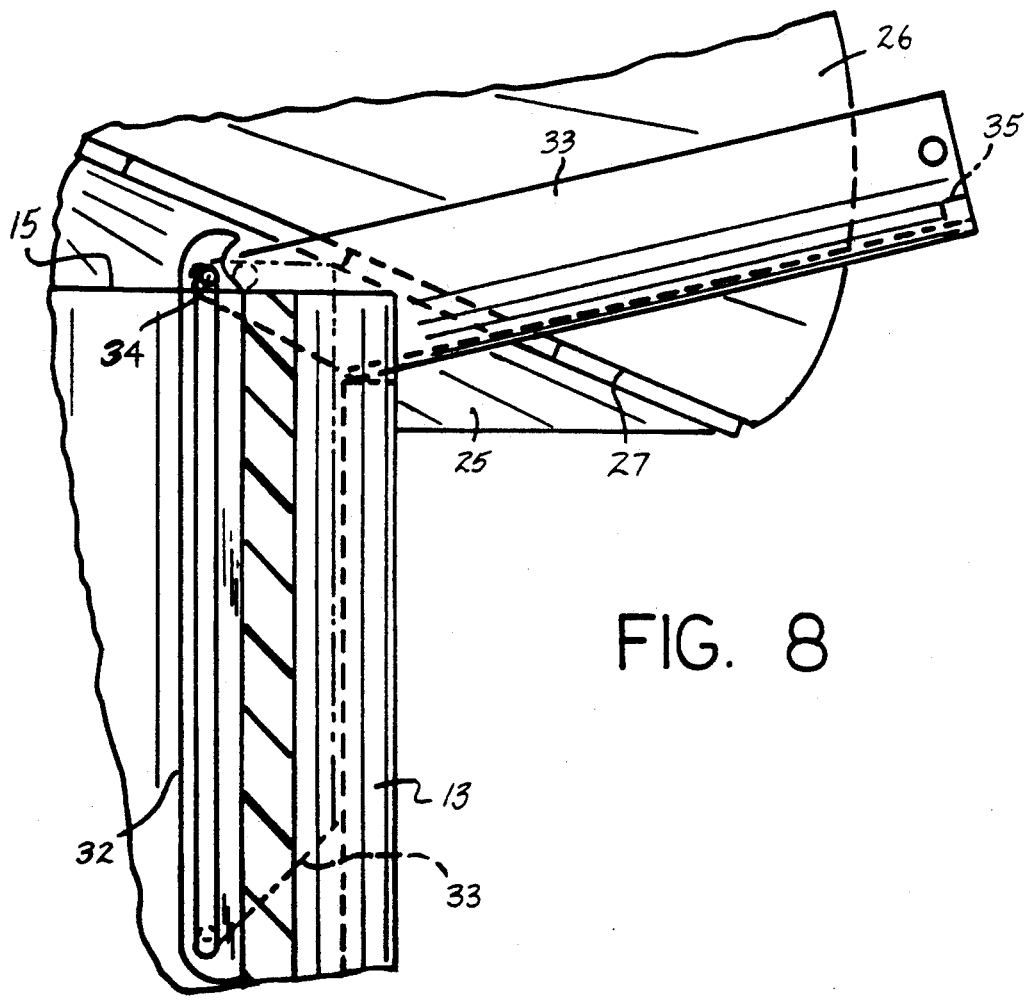
FIG. 8 is an orthographic view, taken along the lines 8—8 of FIG. 7 in the direction indicated by the arrows.

The FIGS. 7 and 8 indicates the use of a modified conical cap plate 25 fixedly secured to the housing second end 15, wherein a cap door 26 of a generally triangular configuration is pivotally mounted to the cap plate 25 about a hinge 27 that is directed radially from an outer periphery of the cap plate 25 to its axial central that is coincident with the axis 11a. A second end recess 29 directed into the second end 15 and in communication therewith includes a recess floor 30 oriented below the tubular housing second end. Parallel tracks 31 are arranged in a parallel coextensive relationship relative to one another and to the axis 11a, and are oriented on opposed sides of the recess 29 within the housing and extend from an orientation between the second end 15 and the cap plate 25 to an orientation within the housing between the second end and the housing floor 16. Each of the parallel tracks 31 includes a track slot 32 that are arranged in a parallel coextensive relationship, and a chute tray 33 is provided slidably mounted between the tracks 31, with the chute tray having chute tray lugs 34 mounted at a lowermost end of the chute tray, with one of said lugs 34 slidably mounted within each of the slots 32. A handle 35 is mounted to the tray 33 at the tray second end for ease of grasping the tray to effect lifting of the tray from within the housing and its orientation within the recess to ease directing of bird feed along the chute into the cavity 19 for filling of the housing with bird feed and the like.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A bird feeder apparatus, comprising, a support post, the support post including a support post uppermost end having a support post plate, and a tubular housing, the tubular housing including a housing first end and a housing second end, and the tubular housing symmetrically oriented about a housing axis, and the support post coaxially aligned with the housing axis, and the tubular housing including a housing floor, with the housing floor fixedly secured to the support post plate, and the housing floor positioned within the tubular housing between the housing first end and the housing second end, and a support ring oriented exteriorly of and fixedly secured to the tubular housing in adjacency to the housing floor, and a plurality of housing slots directed through the tubular housing between the housing floor and the housing second end, and the housing having a housing cavity oriented between the housing floor and the housing second end, and a conical cap plate mounted to the housing second end, said conical cap plate including door means for permitting directing of bird feed within the housing cavity, and a first sleeve fixedly secured to the support post oriented between the support post plate and the housing first end, and a second sleeve slidably mounted to the support post extending beyond the housing first end, and a spring member wound about the support post extending between the first sleeve and the second sleeve and secured to the first sleeve and the second sleeve.

2. An apparatus as set forth in Claim 1 wherein the door means includes a cap door, and a hinge member mounted within the cap door and the cap permitting access into the housing cavity, with the cap plate having an outer periphery and the hinge extending from the outer periphery medially of the cap plate intersecting the housing axis.

3. An apparatus as set forth in Claim 2 including a recess directed into the housing second end, wherein the recess includes a recess floor, and a plurality of parallel tracks, one of said parallel tracks mounted to each side of said recess within the housing, and the tracks oriented parallel relative to one another and to the housing axis, and each of the tracks including a track slot, and each track slot arranged parallel and coextensive relative to one another, and a chute tray, with the chute tray having a tray first end and a tray second end, the tray first end including a plurality of lugs, with each lug received within one of said slots, and the tray second end having a handle permitting manual manipulation of the tray for removal from the housing axis and positioned within the recess on the recess floor.

* * * * *